United States Patent
Van Den Broeck et al.

(10) Patent No.: US 8,241,719 B2
(45) Date of Patent: Aug. 14, 2012

(54) CREEP RESISTANT ALUMINIUM ALLOY FOR MULTILAYER TUBES

(75) Inventors: Ria Van Den Broeck, Tienen (BE); Michel Vanden Eynde, Heverlee (BE); Arthur Speelman, Duffel (BE)

(73) Assignee: Aleris Aluminum Duffell BVBA, Duffel (BE)

( * ) Notice: Subject to any disclaimer, the term of this patent is extended or adjusted under 35 U.S.C. 154(b) by 479 days.

(21) Appl. No.: 12/513,640

(22) PCT Filed: Nov. 13, 2007

(86) PCT No.: PCT/EP2007/009815
§ 371 (c)(1),
(2), (4) Date: May 5, 2009

(87) PCT Pub. No.: WO2008/058708
PCT Pub. Date: May 22, 2008

(65) Prior Publication Data
US 2010/0086717 A1    Apr. 8, 2010

Related U.S. Application Data

(60) Provisional application No. 60/891,383, filed on Feb. 23, 2007.

(30) Foreign Application Priority Data

Nov. 14, 2006    (EP) .................................. 06023655

(51) Int. Cl.
*B32B 1/08*    (2006.01)
*B32B 1/02*    (2006.01)

(52) U.S. Cl. ............. 428/35.9; 428/34.1; 428/34.2; 428/35.7; 428/36.9; 138/124; 138/125; 138/126; 138/127; 138/137

(58) Field of Classification Search .......... 428/34.1, 428/34.2, 35.7, 35.9, 36.9; 138/124, 125, 138/126, 127, 137
See application file for complete search history.

(56) References Cited

U.S. PATENT DOCUMENTS

| 6,284,386 B1 | 9/2001 | Jeffrey et al. |
| 7,262,240 B1 * | 8/2007 | Breton et al. ............. 524/404 |
| 2001/0007720 A1 | 7/2001 | Soga et al. |
| 2001/0028960 A1 | 10/2001 | Gray et al. |

(Continued)

FOREIGN PATENT DOCUMENTS

CN    1552929 A    12/2009
(Continued)

OTHER PUBLICATIONS

Hufnagel, W., "Key to Aluminium Alloys", 4th Edition, Aluminium-Schluessel=Key to Aluminium Alloys, pp. 195-205 (1991).

*Primary Examiner* — Marc Patterson
(74) *Attorney, Agent, or Firm* — Novak Druce + Quigg, LLP

(57) ABSTRACT

The invention relates to an aluminum alloy product containing, in wt. %: Si 0.2 to 1.4; Fe+Mn 1.1 to 1.8; Cu 0.15 to 0.5; Mg<0.2; Ti<0.2; Zn<1.5; impurities<0.05 each, <0.2 total, balance aluminum. This aluminum alloy product has high resistance to internal pressure when used as core layer for welded multilayer tubing. The invention relates also to a method of manufacturing such alloy product, and the use of such alloy in welded multilayer tubes.

25 Claims, 1 Drawing Sheet

U.S. PATENT DOCUMENTS

2004/0182482 A1  9/2004  Gray et al.

FOREIGN PATENT DOCUMENTS

| | | |
|---|---|---|
| DE | 199 53 737 C1 | 7/2001 |
| EP | 1 323 839 A1 | 7/2003 |
| EP | 1 743 761 A2 | 1/2007 |
| GB | 2 321 869 A | 8/1998 |
| JP | 6-212331 A | 8/1994 |
| JP | 7-102337 A | 4/1995 |
| JP | 7-179971 A | 7/1995 |
| JP | 7-278710 A | 10/1995 |
| JP | 9-296262 A | 11/1997 |
| JP | 9-316577 A | 12/1997 |
| JP | 10-265881 A | 10/1998 |
| JP | 10-298686 A | 11/1998 |
| JP | 11-315335 A | 11/1999 |
| JP | 2000-144290 A | 5/2000 |
| RU | 2252975 C1 | 5/2005 |
| WO | 97/18946 A1 | 5/1997 |
| WO | 01/03667 A1 | 1/2001 |
| WO | 01/56782 A2 | 8/2001 |
| WO | 02/077307 A1 | 10/2002 |

* cited by examiner

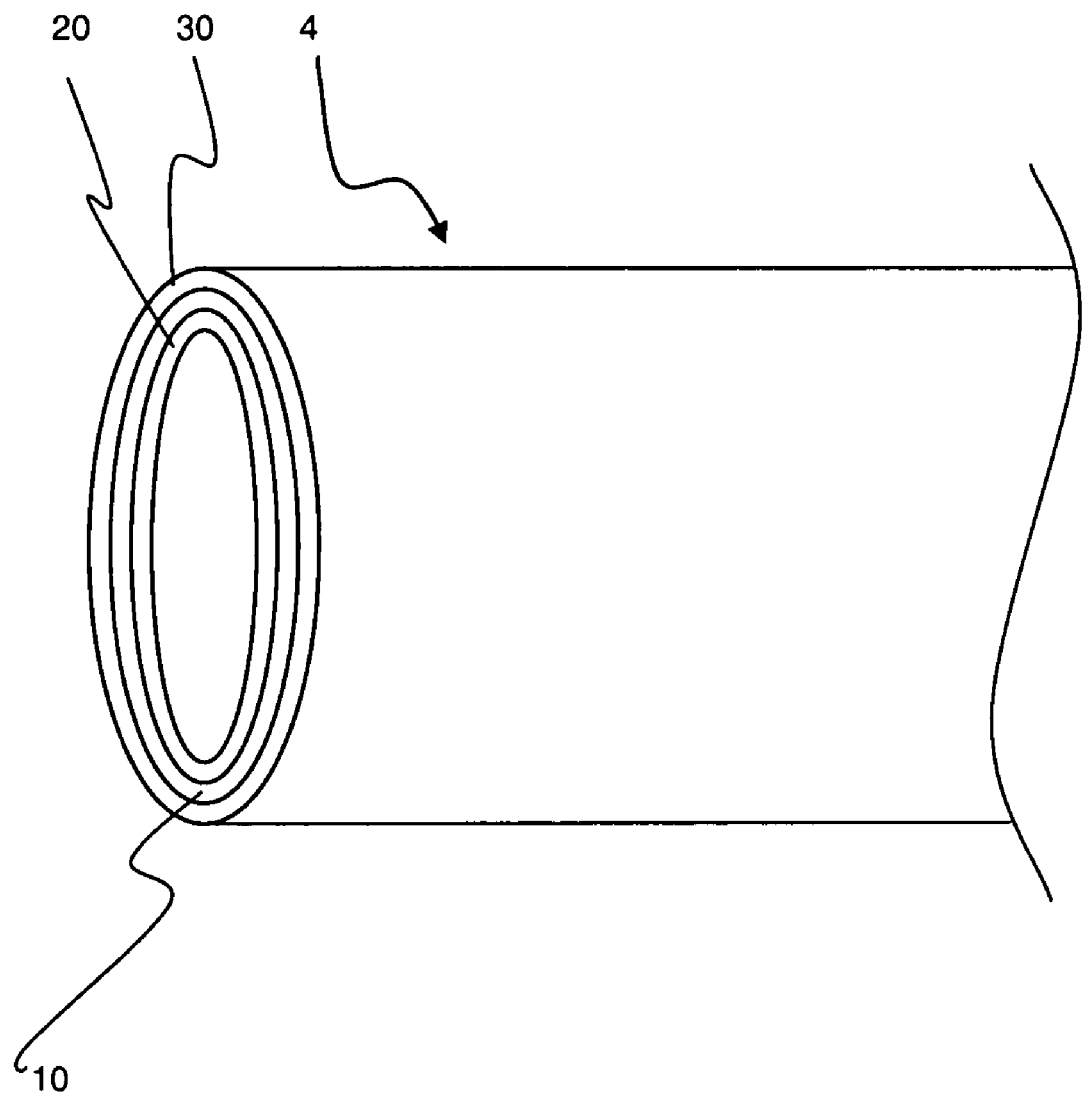

CREEP RESISTANT ALUMINIUM ALLOY FOR MULTILAYER TUBES

This application is a §371 National Stage Application of International Application No. PCT/EP2007/009815, filed on 13 Nov. 2007, claiming the priority of EP Patent Application No. 06023655.1 filed on 14 Nov. 2006 and U.S. Provisional Application No. 60/891,833 filed on 23 Feb. 2007.

FIELD OF THE INVENTION

The invention relates to a low-creep aluminium alloy product, in particular for multilayer tubes. More specifically, the present invention relates to an aluminium alloy with particularly high creep rupture strength, i.e. high resistance to internal pressure at elevated temperature. The aluminium alloy is therefore particularly suited for use in multilayer tubes, which may be used as sanitary pipes, heating pipes etc. in building installations. The invention is also directed to a multilayer tube having inner and outer layers made of plastic (polymer) and a core layer made of the aluminium alloy, as well as to a method of producing such aluminium alloy product, and the use of such aluminium alloy in multilayer tubes.

BACKGROUND OF THE INVENTION

As will be appreciated herein below, except as otherwise indicated, alloy designations and temper designations refer to the Aluminum Association designations in Aluminum Standards and Data and the Registration Records, as published by the Aluminum Association in 2006.

For any description of alloy compositions or preferred alloy compositions, all references to percentages are by weight percent unless otherwise indicated.

Multilayer tubes consisting of co-extruded polyethylene or polypropylene tubes with a metal core have found many applications in the building industry, for example as sanitary pipes, heating pipes, gas distribution pipes etc., as well as in other industries such as the pharmaceutical, chemical or food industries. Compared to plastic tubes, multilayer tubes having an aluminium alloy core layer are impermeable to oxygen, have higher strength and heat resistance, as well as a low expansion coefficient. Such multilayer tubes are easy to install since they can be bent and cut to the desired length on site. They are also preferred to tubes made of metal only, since the plastic inner and outer layers improve the corrosion resistance and serve as noise barrier. They also save weight and have a better formability.

Such multilayer tubes have an outer plastic layer, an inner plastic layer and an aluminium core layer for mechanical strength and long time performance. The inner and outer plastic layers are generally bonded to the aluminium core by means of an outer and inner adhesive layer, respectively.

The most critical property of multilayer tubes in heating and sanitary applications is the resistance to constant and sustained internal pressure at increased temperatures. This is generally tested by the standardized internal pressure tests ASTM-F1281, ASTM-F1282 or DVGW-W542 in which the tube is kept at 30 bar and 95° C. until the tube fails. From the time until failure, one may extrapolate the expected lifetime of the tube under the conditions encountered, for example, in the sanitary system of a building, i.e. a temperature of 70° C. at 20 bar. A high resistance against sustained internal pressure is especially important if the metal core layer is to be kept as thin as possible, and for tubes with larger diameters.

Aluminium alloys currently used as core layer in multilayer tubing are AA3003 and AA3005-series aluminium alloys.

The AA3003 aluminium alloy has a chemical composition, in wt. %, of:

| | |
|---|---|
| Si | <0.6 |
| Fe | <0.7 |
| Cu | 0.05 to 0.20 |
| Mn | 1.0 to 1.5 |
| Zn | <0.10, | impurities <0.05 each, total <0.15,
balance aluminium.

This aluminium alloy has previously been used in multilayer tubes because it is relatively inexpensive and has sufficient strength. However, it does not perform well under the sustained pressure tests.

EP-1323839-A1 discloses an aluminium brazing alloy suitable as fin stock material, having a composition, in wt. %, of: Si 0.7 to 1.2, Mn 0.7 to 1.2, Mg<0.2, Fe<0.8, Zn<3.0, Ni<1.5, Cu<0.5, optionally one or more elements selected from the group comprising (Ti<0.20, In<0.20, Zr<0.25, V<0.25, Sn<0.25, Cr<0.25), impurities <0.05 each, total <0.15, balance aluminium. This composition was chosen because of its improved post-braze 0.2% yield strength in comparison to conventional brazing alloys. The aluminium alloy also has a good corrosion resistance and an improved tolerance for impurity elements. The resistance of the alloy to sustained pressure, as required for welded multilayer tubes, has not been tested or considered.

A need therefore exists for an aluminium alloy for use in multilayer tubes that has improved resistance to constant and subtained internal pressure, ideally at elevated temperature of for example 95° C.

DESCRIPTION OF THE INVENTION

It is an object of the present invention to provide an aluminium alloy product with an improved resistance to sustained internal pressure, as compared to conventional aluminium alloys used in multilayer tubes. It is another object of the present invention to provide an improved multilayer tube having outer and inner layers made of plastic, and a core layer made of an aluminium alloy product.

These and other objects and further advantages are met or exceeded by the present invention in which there is provided an aluminium alloy product, ideally in the form of a rolled product for a welded tube, the aluminium alloy containing, in weight %:

| | |
|---|---|
| Si | 0.2 to 1.4 |
| Fe + Mn | 1.1 to 1.8 |
| Cu | 0.15 to 0.5 |
| Mg | <0.20 |
| Ti | <0.20 |
| Zn | <1.5, | and other impurities or incidental elements each <0.05, total <0.20, and the balance being aluminium.

This aluminium alloy has shown an excellent resistance against sustained pressure, as it did not fail in the ASTM-F1281 creep test after more than 100 hours at 95° C. and a 30 bar internal pressure. The aluminium alloy also has a considerable tolerance for impurities. For the purpose of this invention the aluminium alloy product is devoid of any metallic layers.

The present invention has further recognized that creep can be minimized and, therefore, the resistance to sustained pressure significantly increased, if the grain size is small, and a large number of elements are present in solid solution.

In comparison to the AA3003 alloy, the Si-content can be relatively high, in order to achieve the desired creep resistance. A preferred lower limit for the Si-content is about 0.85%, and more preferred 0.95%.

The Si-content, however, should not be too high, so that the solidus is not too much lowered and homogenization is still possible in order to decrease the final grain size. This serves to minimize creep and to increase also the formability of the product, and hence the bendability of a multilayer tube with the core layer made of such aluminium alloy product. The upper limit for Si is therefore 1.4%, preferably 1.2% and more preferably 1.05%. The weldability requirements might also influence the choice of the particular Si-content.

The Cu-content is also higher in comparison with the AA3003 alloy, and serves to improve the resistance to sustained pressure. Cu is generally known to decrease the corrosion resistance. However, this is not detrimental to the current invention, since the aluminium alloy product will preferably be used as core layer in a multilayer tube, and will therefore be protected from corrosion by the inner and outer plastic layers. The lower limit for Cu is 0.15%, and more preferably about 0.20%, and the upper limit is preferably 0.30%.

Fe and Mn are also kept relatively high, viz. at least 1.1%, but not too high to avoid pre-solidification of coarse particles during casting, so the sum of Fe and Mn should be restricted to 1.8%. The exact Fe- and Mn-content are tuned based on the formability, corrosion resistance and weldability requirements of the specific application.

In one embodiment of the Fe and Mn contents, the Fe content is for example in the range of 0.20% to 0.8%, and preferably in the range of 0.30% to 0.45%. At such Fe content the Mn content is preferably in a range of 0.7% to 1.15%, and more preferably in a range of 0.90% and 1.15%. A more preferred upper-limit for the Mn-content is 1.10%.

In another embodiment of the Fe and Mn contents, the Fe content is at a range of 0.90 to 1.30%, and preferably at a range of 0.90 to 1.20%, whereas the Mn-content is preferably in a range of 0.20 to 0.50%, and preferably in a range of 0.30 to 0.50%.

Mg may also be added in order to improve the elongation at fracture and tensile strength properties of the aluminium alloy and should be less than 0.2%. The Mg content is preferably in the range of 0.05 to 0.10%.

Ti may also be added to enhance strength and corrosion resistance, and preferably is in an amount of 0.11 to 0.16%.

Pb and Bi may also be present as impurity elements. The upper limit for the sum of Pb+Bi is preferably <0.05%, and more preferably <0.02%.

The Zn content is considerably lower than in the prior art aluminium brazing alloy disclosed in EP-1323839-A1. The present invention specifies an upper limit of 1.5%, preferably 0.50%, and more preferably 0.20%.

Zr is preferably not added to the aluminium alloy of the invention, but is present as an unavoidable impurity element at a level of <0.05%, and preferably <0.02%. Thus, preferably the aluminium alloy may be substantially free from Zr.

Cr is preferably not added to the aluminium alloy of the invention, but is present as an unavoidable impurity element at a level of <0.05%, and preferably <0.02%. Thus, preferably the aluminium alloy may be substantially free from Cr.

In another aspect of the invention it is directed to a flexible multilayer tube having a core layer made of an aluminium alloy as specified above and set forth in the claims, an inner layer made of plastic, and an outer layer made of plastic. The inner and/or outer layers are preferably made of polyethylene (PE), polypropylene or cross-linked polyethylene (PEX). Any other commercially available plastics suitable for flexible piping applications may also be used. The gauge range of the aluminium core alloy is typically in the range of about 0.1 to 1.0 mm, and preferably in a range of about 0.15 to 0.6 mm. For the purpose of this invention the aluminium alloy product is devoid of any metallic layers, such metallic layer(s) are commonly applied for in amongst others brazing sheet in order to enhance the corrosion performance by providing sacrificial protection to the core alloy and/or to provide a filler metal, typically an AlSi alloy, for the brazing operation.

The aluminium core layer is ideally produced as a rolled sheet product which is then bent into the shape of a tube and then welded at the seam. The metal core may be overlap-welded or butt-welded. Welding may be performed using various welding techniques, and include ultrasonic welding, TIG ("Tungsten Inert Gas") welding, and laser welding.

An aluminium alloy product according to the invention can be prepared by casting an ingot; homogenizing and/or pre-heating the ingot after casting, hot-rolling the ingot; cold-rolling to a final gauge; annealing the cold-rolled product at a temperature of about 250° C. to 550° C., preferably at a temperature of about 300° C. to 400° C.; optionally stretching and/or ageing the final product.

The invention is also directed to the use of the above-described aluminium alloy in flexible multilayer tubes having outer and inner layers made of plastic, and a core layer made of aluminium alloy product. Such tube is preferably a sanitary pipe or heating pipe for buildings. For such application the multilayer tube can be bent, thus is flexible, and has a length of several meters, for example 4 to 50 meters or more in length.

The drawing of FIG. 1 shows a perspective view of an end portion of a multi-layer tube 4 of the present invention having an aluminium core layer 10, an inner layer 20 and an outer layer 30. according to this invention the aluminium core alloy is devoid of any metallic layer(s).

In the following, the invention will be explained by the following, non-limitative example.

EXAMPLE

Five alloys according to Table 1 were tested. Alloy A is an AA3003 alloy, alloy B is an AA8006 alloy, and alloys C to E are alloys according to the invention. The main differences of alloy C to alloys A and B are the increased Si, Cu, Zn and Ti content. Alloy D has in particular an increased Cu content compared to Alloy A. Alloy E has in particular an increased Si and Cu content compared to alloy B. Samples of welded tubes were prepared as follows:

Alloys A to E with chemical composition as listed in Table 1 were cast into 500 mm thick ingots by conventional direct chill casting. The ingots were then homogenized and optionally pre-heated to temperatures as listed in Table 2. The ingots were then hot-rolled to a hot-rolling gauge of 3 mm. The hot-rolled products were cold-rolled to a final gauge of 0.25 mm. The cold-rolled products were subjected to alcalic (alkaline) degreasing before final annealing. The cold-rolled coils were annealed at temperatures of 400° C. or 350° C. The coils were then slit into strips of 66 mm width and produced into welded pipes (tubes) of 16 mm inner diameter. The seam was butt-welded (Alloys C, D, E) or overlap-welded (Alloys A and B).

The sustained pressure test according to ASTM-F1281 was then performed on the tubes thus produced. In this test, samples were kept at a constant temperature of 95° C. and 30 bar internal pressure. The results are shown in Table 3. Alloy C, D and E have been tested also at a higher internal pressure, and the results are shown in Table 4.

Table 3 also shows the results of other tests, namely the ultimate tensile strength TS, the yield strength YS, and the elongation at rupture A50 mm measured according to EN1002.

As can be seen from the results of Table 3, the alloy C according to the invention has a surprisingly significantly longer lifetime under the internal pressure test ASTM-F1281. Its lifetime is more than 100 times longer than that of alloy B, which is an AA8006 alloy that already performs better than alloy A that is an AA3003 alloy.

The tensile strength of alloy C is also higher than each of the alloys A and B, and its yield strength is higher than that of alloy A although not quite as high as that of alloy B.
Alloy E has due to a lower Si-content an lower yield strength which is favourable for the formability, for example by means of roll forming. However, it also has a somewhat lower elongation.

As can be seen from the results of Table 4, the alloys C, D, and E have also a favourable high lifetime at higher pressure compared to the 30 bar internal pressure as presented in Table 3.

It has been found also that the Si-content plays an important role in the weldability of the aluminium alloys. Alloy C has a relatively high Si-content and has been found to be very good weldable for overlap joining and for laser welding at high weld speed. Whereas, Alloys D and E have a relatively low Si content compared to alloy C, and these alloys are ideally suitable for laser welding at low weld speed and for TIG welding.

Such high mechanical properties, good formability and weldability, and high creep rupture strength, i.e. the high resistance against internal pressure at elevated temperature renders the aluminium alloy according to the invention an ideal candidate for application in flexible multilayer tubes.

TABLE 1

Alloy compositions, in wt. %, balance aluminium and inevitable impurities.

| | Alloying element | | | | | | |
|---|---|---|---|---|---|---|---|
| Alloy | Si | Fe | Cu | Mn | Mg | Ti | Zn |
| A | 0.19 | 0.49 | 0.07 | 1.08 | 0.01 | 0.02 | 0.01 |
| B | 0.13 | 1.34 | 0.02 | 0.39 | 0.01 | 0.02 | 0.02 |
| C | 0.98 | 0.43 | 0.25 | 1.10 | 0.06 | 0.11 | 0.10 |
| D | 0.21 | 0.57 | 0.18 | 1.02 | 0.03 | 0.01 | 0.02 |
| E | 0.33 | 1.27 | 0.25 | 0.37 | 0.07 | 0.01 | 0.04 |

TABLE 2

Process parameters.

| Alloy | Homogenisation/preheat | Start hot rolling T | Finish hot rolling T | Final annealing |
|---|---|---|---|---|
| A | 600° C./14 h + 500° C./5 h | 480° C. | 310° C. | 400° C. |
| B | 480° C./6 h | 440° C. | 310° C. | 400° C. |

TABLE 2-continued

Process parameters.

| Alloy | Homogenisation/preheat | Start hot rolling T | Finish hot rolling T | Final annealing |
|---|---|---|---|---|
| C | 600° C./14 h + 500° C./5 h | 480° C. | 310° C. | 350° C. |
| D | 600° C./14 h + 500° C./5 h | 480° C. | 310° C. | 350° C. |
| E | 600° C./14 h + 500° C./5 h | 480° C. | 310° C. | 350° C. |

TABLE 3

Test results.

| | Property | | | | |
|---|---|---|---|---|---|
| Alloy | TS (MPa) | YS (MPa) | A50 (%) | Lifetime ASTM-F1281 | Grain size (micron) |
| A | 115 | 46 | 33 | 5-15 min | 100 |
| B | 131 | 80 | 31 | 0.3-3 h | 100 |
| C | 137 | 56 | 26 | 1150 h | 100 |
| D | 126 | 54 | 30 | >280 h | — |
| E | 121 | 57 | 20 | — | — |

TABLE 4

Lifetime according to ASTM-F1281 at 95° C. for various internal pressures.

| | Lifetime as function of internal pressure | | |
|---|---|---|---|
| Alloy | 35 bar | 37 bar | 42 bar |
| C | 160 h | — | — |
| D | — | — | >1 h |
| E | — | >24 h | — |

Having now fully described the invention, it will be apparent to one of ordinary skill in the art that many changes and modifications can be made without departing from the spirit or scope of the invention as herein described.

The invention claimed is:

1. Multilayer tube having a tube wall comprising a core layer made solely from a rolled aluminium alloy product devoid of any further metallic layer(s), an inner layer made of plastic and an outer layer made of plastic, and wherein the core layer is an aluminium alloy consisting of, in wt. %:

| | |
|---|---|
| Si | 0.2 to 1.4 |
| Fe + Mn | 1.1 to 1.8 |
| Cu | 0.15 to 0.5 |
| Mg | <0.20 |
| Ti | <0.20 |
| Zn | <1.5, |
| Pb + Bi | <0.05%. | and other impurities or incidental elements each <0.05, total <0.2, and the balance being aluminium.

2. Multilayer tube having a tube wall comprising a core layer made solely from a rolled aluminium alloy product devoid of any further metallic layer(s), an inner layer made of plastic and an outer layer made of plastic, and wherein the core layer is an aluminium alloy consisting of, in wt. %:

| | |
|---|---|
| Si | 0.2 to 1.4 |
| Fe + Mn | 1.1 to 1.8 |
| Cu | 0.15 to 0.5 |
| Mg | <0.20 |
| Ti | <0.20 |
| Zn | <1.5, | and other impurities or incidental elements each <0.05, total <0.2, and the balance being aluminium.

3. Multilayer tube according to claim 1, wherein the Si-content is in a range of 0.85 to 1.4%.

4. Multilayer tube according to claim 1, wherein the Fe-content in the core layer is in a range of 0.20 to 0.8%, and Mn is in the range of 0.90 to 1.15%.

5. Multilayer tube according to claim 1, wherein the Mn-content in the core layer is in a range of 0.20 to 0.50%, and Fe is in the range of 0.90 to 1.30%.

6. Multilayer tube according to claim 1, wherein the Cu-content in the core layer is in a range of 0.15 to 0.30%.

7. Multilayer tube according to claim 1, wherein the Mg-content in the core layer is in a range of 0.05 to 0.10%.

8. Multilayer tube according to claim 1, wherein the Zn-content in the core layer is in a range of at most 1.0%.

9. Multilayer tube according to claim 1, wherein the Ti-content in the core layer is in a range of 0.11 to less than 0.20%.

10. Multilayer tube according to claim 1, wherein the core layer has a gauge in a range of 0.1 to 1.0 mm.

11. Multilayer tube according to claim 1, wherein the tube has a resistance against sustained pressure without failure of more than 100 hours at 95° C. at a 30 bar internal pressure in accordance with ASTM-F1281 creep test.

12. Multilayer tube according to claim 1, wherein the multilayer tube is a sanitary pipe or heating pipe in a building.

13. Multilayer tube according to claim 1, wherein the core layer is bent into the shape of a tube and welded at its seam.

14. Multilayer tube according to claim 1, wherein the Si-content is in a range of 0.85 to 1.2%.

15. Multilayer tube according to claim 1, wherein the Fe-content in the core layer is in a range of 0.30 to 0.45%, and Mn is in the range of 0.90 to 1.15%.

16. Multilayer tube according to claim 1, wherein the Mn-content in the core layer is in a range of 0.30 to 0.50%, and Fe is in the range of 0.90 to 1.30%.

17. Multilayer tube according to claim 1, wherein the Cu-content in the core layer is in a range of 0.20 to 0.30%.

18. Multilayer tube according to claim 1, wherein the Zn-content in the core layer is in a range of at most 0.5%.

19. Multilayer tube according to claim 1, wherein the Zn-content in the core layer is in a range of at most 0.20%.

20. Multilayer tube according to claim 1, wherein the Ti-content in the core layer is in a range of 0.11 to 0.16%.

21. Multilayer tube according to claim 1, wherein the core layer has a gauge in a range of 0.15 to 0.6 mm.

22. Multilayer tube according to claim 1, wherein the Zr-content in the core layer, if present, is at an impurity level of <0.05%.

23. Multilayer tube according to claim 1, wherein the Zr-content in the core layer, if present, is at an impurity level of <0.02%.

24. Multilayer tube according to claim 1, wherein the core layer is substantially free of Zr.

25. Multilayer tube according to claim 1, wherein the core layer is substantially free of Cr.

* * * * *

UNITED STATES PATENT AND TRADEMARK OFFICE
CERTIFICATE OF CORRECTION

| | | |
|---|---|---|
| PATENT NO. | : 8,241,719 B2 | Page 1 of 1 |
| APPLICATION NO. | : 12/513640 | |
| DATED | : August 14, 2012 | |
| INVENTOR(S) | : Van Den Broeck et al. | |

It is certified that error appears in the above-identified patent and that said Letters Patent is hereby corrected as shown below:

On the title page, item (73), Assignee's name: change "Aleris Aluminum Duffell BVBA" to
--Aleris Aluminum Duffel BVBA--

Signed and Sealed this
Sixteenth Day of October, 2012

David J. Kappos
*Director of the United States Patent and Trademark Office*